(12) United States Patent
Singh et al.

(10) Patent No.: US 9,118,797 B2
(45) Date of Patent: Aug. 25, 2015

(54) METHOD AND SYSTEM FOR ROBUST AND FLEXIBLE EXTRACTION OF IMAGE INFORMATION USING COLOR FILTER ARRAYS

(76) Inventors: Tripurari Singh, Seattle, WA (US); Mritunjay Singh, Irvine, CA (US)

(*) Notice: Subject to any disclaimer, the term of this patent is extended or adjusted under 35 U.S.C. 154(b) by 983 days.

(21) Appl. No.: 13/065,650

(22) Filed: Mar. 24, 2011

(65) Prior Publication Data

US 2012/0075493 A1    Mar. 29, 2012

Related U.S. Application Data

(63) Continuation-in-part of application No. 12/951,043, filed on Nov. 20, 2010, now Pat. No. 8,761,525.

(60) Provisional application No. 61/316,840, filed on Mar. 24, 2010, provisional application No. 61/435,291, filed on Jan. 22, 2011, provisional application No. 61/262,923, filed on Nov. 20, 2009.

(51) Int. Cl.
*G06K 9/36* (2006.01)
*H04N 9/07* (2006.01)
*G06T 3/40* (2006.01)

(52) U.S. Cl.
CPC ............... *H04N 9/07* (2013.01); *G06T 3/4015* (2013.01)

(58) Field of Classification Search
None
See application file for complete search history.

(56) References Cited

U.S. PATENT DOCUMENTS 8,761,525 B2 * 6/2014 Singh et al. .................. 382/232
2010/0092082 A1 * 4/2010 Hirakawa et al. ............ 382/167

OTHER PUBLICATIONS

Foi et al, Practical Poissonian-Gaussian Noise Modeling and Fitting for Single-Image Raw-Data, IEEE 2008.*

* cited by examiner

*Primary Examiner* — Mark Roz

(57) ABSTRACT

Methods and systems for robust and flexible extraction of image information using color filter arrays. Methods are provided comprising receiving a sample set of data generated by transforming and sampling an optical property of an original color image in a spatial basis, wherein the transformation effected is substantially local in the spatial basis and has partially overlapping spectra. A generalized inverse of the transform augmented with regularization constraints is applied to the sample set of data to infer original image data. According to one approach the generalized inverse does not use variational minimization or assume constant color ratios. According to an alternative approach regularization can take the form of predetermined spectral constraints applied to the sample set of data to infer the original image data. According to another alternative approach regularization can promote spectral sparsity. Methods are also provided for creating an optical color filter array, for sampling an image, for reducing noise in an image, and for computing a sparse representation of an image signal. Systems for carrying out these and other methods are also provided.

17 Claims, 11 Drawing Sheets

(-pi, pi) (pi, pi)
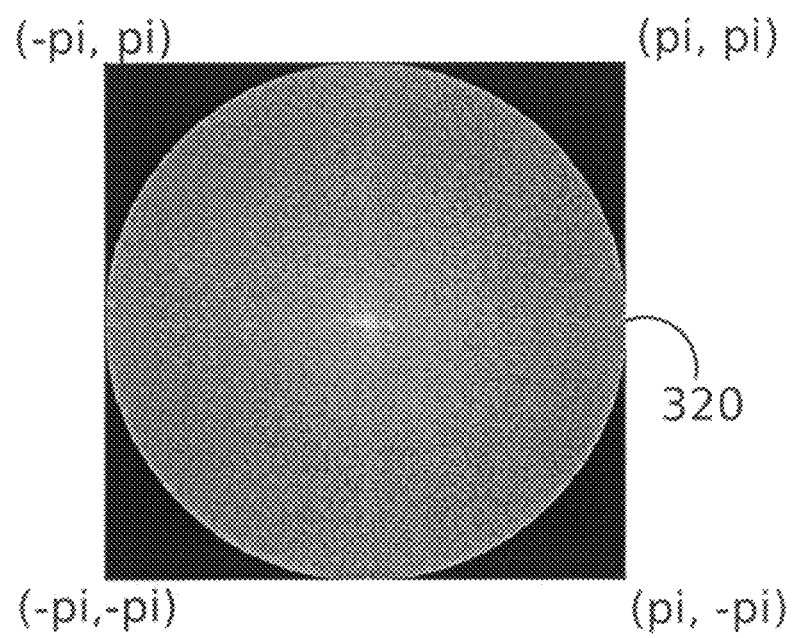
(-pi,-pi) (pi, -pi)
FIG 3

```
function R=Reconstruct(sensor,cfa,rowFactor,...
                                      colFactor)
%       sensor   sensor data (MxNx1)
%       cfa      CFA pattern (mxnxc)
%       R        reconstructed image (MxNxc)
% rowFactor, colFactor  ratio of sensor to input
% image dimensions % dimensionality
M=size(sensor,1); % size of sensed image
N=size(sensor,2); % size of sensed image
m=size(cfa,1);    % size of CFA kernel
n=size(cfa,2);    % size of CFA kernel
c=size(cfa,3);    % number of colors
M2 = M/rowFactor; % size of input image
N2 = N/colFactor; % size of input image % declarations
S = zeros(m*n,c);

r = M2/2;  % radius of circle
r2 = r*r;
alpha = M2/N2;
alpha2 = alpha*alpha;

v=0;
for i=1:M2
    for j=1:N2
        if (i-M2/2-1)^2 +...
             alpha2*(j-N2/2-1)^2 <= r2
          v = v+1;
          circle(v, 1) = i-M2/2-1;
          circle(v, 2) = j-N2/2-1;
        end
    end
end for k=1:c
    S(:,k)=reshape(fft2(cfa(:,:,k)),[m*n,1]);
end
S = S/size(S,1);

A=zeros(M*N, c*v);
for i=1: m
    for j=1: n
        linearIndex = (j-1)*m + i;

if sum(abs(S(linearIndex,:)))...
                               >=0.001)~=0
           % Shift required to take
           % carrier to (1,1)
           rowShift = (i-1)*M/m;
           colShift = (j-1)*N/n;
           for var=1: v
               % (row, col) of variable
               % in (M, N) matrix
               row = 1+rowShift+...
                           circle(var,1);
               col = 1+colShift+...
                           circle(var,2);

% if (row,col) beyond matrix
               % bounds,wrap around-alias
               if (row < 1)
                   row = M+row;
               end
```

```
               if row>M
                   row = row - M;
               end if (col < 1)
                   col = N+col;
               end
               if col>N
                   col = col - N;
               end % the row number in A
               eqnIndex = (col-1)*M + row;
               for k=1: c
                   if S(linearIndex,k) ~= 0
                      colorVarIndex =...
                              (k-1)*v + var;

A(eqnIndex, ...
                         colorVarIndex) = ...
                          S(linearIndex,k);
                   end
               end
           end
        end
    end
end sensorFFT = reshape(fft2(sensor), [M*N, 1]);

solnFFT = A\sensorFFT;

% Reconstruct color image
ImageFFT = zeros(M2, N2, c);
for var=1: size(circle, 1)
    row = 1+circle(var, 1);
    col = 1+circle(var, 2);

% if (row,col) outside matrix bounds,
    % wrap around.
    if (row < 1)
        row = M2+row;
    end
    if row>M2
        row = row - M2;
    end if (col < 1)
        col = N2+col;
    end
    if col>N2
        col = col - N2;
    end for k=1: c
        ImageFFT(row, col, k) = ...
              solnFFT((k-1)*v + var);
    end
end for k=1: c
    Image(:,:,k) = ifft2(ImageFFT(:,:,k));
end R = real(Image); % to allow for imperfect
                 % precision
```

FIG. 8

```
f = double(imread('tiny.tif'));
% Leave only so much info so it's deterministic
for k=1: 3
    B(:,:,k) = LpfDCTidct2(Lpf(dct2(f(:,:,k)), 0.65));
end
f = B;
[m n c] = size(f);

scrsz = get(0,'ScreenSize');
figure(1)
set(1,'Position',[0 scrsz(4)*0.05 scrsz(3)/1 0.3*scrsz(4)])
subplot(1,3,1)
imagesc(uint8(f))
axis off
axis equal
title('Original image','FontName','Times','FontSize',14)

CFA = zeros(3*m, n);
rnd = randn(m, n);
for i=1: m
    for j=1: n
        if rnd(i, j) < -0.4307
            CFA(i, j) = 1;
        else if rnd(i, j) < 0.4307
            CFA(m+i, j) = 1;
        else
            CFA(m+m+i, j) = 1;
        end
    end
end % defin the the function handles that compute
% the filtering and the conjugate filtering.
R = @(x) CFA.*x;
RT = @(x) CFA.*x;

% define the function handles that compute the transformation
% of the image to the sparse domain (WT) and its transpose (W)
W = @(x)FilteredDct(x);
WT = @(x)FilteredDct(x);

%Finally define the function handles that compute
% the products by A = RW and A' =W'R'
A = @(x) R(W(x));
AT = @(x) WT(RT(x));

tallf = [f(:,:,1); f(:,:,2); f(:,:,3)];
% generate noisy filtered observations
sigma = 4*sqrt(2);
y = R(tallf) + sigma*randn(size(tallf));

f_noisy = f + sigma*abs(randn(size(f)));
[MAE, MSE, PSNR]=Metrics(f, f_noisy);
fprintf('MAE=%f, MSE=%f, PSNR=%f\n', MAE, MSE, PSNR);

tau = .3; % regularization parameter
tolA = 1.e-6;

[theta,theta_debias,obj_QP_BB_mono,times_QP_BB_mono,...
    debias_start,mses_QP_BB_mono] = ...
    GPSR_BB(y,A,tau,...
    'AT', AT,...
    'Debias',1,...
    'Initialization', AT(y),...
    'True_x',WT(tallf),...
    'Monotone',1,...
    'ToleranceA',tolA);

filteredPic = uint8(zeros(size(f)));
for k=1:c
    filteredPic(:,:,k) = uint8(y((k-1)*m+1:k*m,:));
end
```

```
% ===== Plotting results =====
figure(1)
subplot(1,3,2)
imagesc(filteredPic)
axis off
axis equal
title('Filtered image','FontName','Times','FontSize',14)

figure(1)
subplot(1,3,3)
pic = double(zeros(size(f)));
if prod(size(theta_debias))~=0
    tallPic = W(theta_debias);
else
    tallPic = W(theta);
end
for k=1: c
    pic(:,:,k) = tallPic((k-1)*m+1:k*m,:);
end

[MAE, MSE, PSNR]=Metrics(f, pic);
fprintf('MAE=%f, MSE=%f, PSNR=%f\n', MAE, MSE, PSNR);

pict = uint8(pic);
imagesc(pict)
axis off
axis equal
title('Reconstructed image','FontName','Times','FontSize',14)

function Y = Lpf(X, r)

A = fftshift(X);
r = r*size(A, 1)/2;
r2 = r*r;
alpha = size(A,1)/size(A,2);
alpha2 = alpha*alpha;

for i=1:size(A, 1)
    for j=1:size(A, 2)
        if (i-size(A,1)/2-1)^2+ alpha2*(j-size(A, 2)/2-1)^2 > r2
            A(i, j) = 0;
        end
    end
end Y = fftshift(A);

function S= FilteredDct(x)
m = size(x, 1)/3;
S = [Lpf(dct2(x(1:m,:)),0.65); Lpf(dct2(x(m+1:2*m,:)),0.65);
Lpf(dct2(x(2*m+1:3*m,:)),0.65)];
end function x= FilteredIDct(s)
m = size(s, 1)/3;
x = [idct2(Lpf(s(1:m,:),0.65)); idct2(Lpf(s(m+1:2*m,:),0.65));
idct2(Lpf(s(2*m+1:3*m,:),0.65))];
end function [MAE, MSE, PSNR] = Metrics(A, B)

E=abs(B-A);
E=[E(:)];
MAE=sum(E)/size(E,1);
E=E.^2;
MSE=sum(E)/size(E,1);
PSNR=10*log10(255^2/MSE);
```

FIG. 10

METHOD AND SYSTEM FOR ROBUST AND FLEXIBLE EXTRACTION OF IMAGE INFORMATION USING COLOR FILTER ARRAYS

RELATED APPLICATIONS

This application is based on and claims the benefit of priority of U.S. Provisional Application No. 61/316,840, filed Mar. 24, 2010 and of U.S. Provisional Application No. 61/435,291, filed Jan. 22, 2011, which are hereby incorporated by reference in their entirety.

This application is also based on and claims the benefit of priority of U.S. application Ser. No. 12/951,043, filed Nov. 20, 2010, and of U.S. Provisional Application No. 61/262,923, filed Nov. 20, 2009, the priority benefit of which was claimed in U.S. application Ser. No. 12/951,043, both of which applications are hereby incorporated by reference in their entireties.

BACKGROUND OF THE INVENTION

1. Field of the Invention

Embodiments of the present invention relate to multi-spectral imaging systems such as still cameras, video cameras, scanners and microscopes and more specifically to imaging systems that use fewer sensor elements than previous techniques for comparable image quality.

2. Background Information

Images herein can be considered signals whose amplitude may represent some optical property such as intensity, color and polarization which may vary spatially but not significantly temporally during the relevant measurement period. In color imaging, light intensity typically is detected by photosensitive sensor elements or photosites. An image sensor is composed of a two dimensional regular tiling of these individual sensor elements. Color imaging systems need to sample the image in at least three basic colors to synthesize a color image. We use the term "basic colors" to refer to primary colors, secondary colors or any suitably selected set of colors. We exclude color difference signals, many of which are used in popular color spaces, from the definition of basic colors. Furthermore, all references to red, green and blue should be construed to apply to any set of basic colors.

We only consider systems that sense a "substantially local" transform in the spatial domain of the image signal, which is a transform whose value at a point depends only on the signal in its close neighborhood.

Color sensing may be achieved by a variety of means such as, for example, (a) splitting the image into three identical copies, separately filtering each into the basic colors, and sensing each of them using separate image sensors, or (b) using a rotating filter disk to transmit images filtered in each of the basic colors onto the same image sensor.

However, a very popular design for capturing color images is to use a single sensor overlaid with a color filter array ("CFA"). This includes the straightforward design wherein the value of each output pixel is determined by three sensing elements, one for each basic color, usually arranged in horizontal, vertical or diagonal stripes. This design yields red, green and blue images of equal resolution, or equivalently luminance and chrominance signals of equal bandwidth. 'Luminance" is defined as a weighted sum of basic color signals where all the weights are positive while "chrominance", is defined as a weighted sum of basic color signals where at least one weight is negative. The color stripe design is still used in high end cameras such as the Panavision Genesis Digital Camera, http://www.panavision.com/publish/2007/11/09/Genesis.pdf, page 2, 2007. Newer CFA designs by Bayer (see FIG. 4 and B. E. Bayer, "Color imaging array", Jul. 20, 1976. U.S. Pat. No. 3,971,065) and others (see K. Hirakawa and P. J. Wolfe, "Spatio-spectral color filter array design for enhanced image fidelity" in Proc. of IEEE ICIP, pages II: 81-84, 2007 and L. Condat, "A New Class of Color. Filter Arrays with Optimal Sensing Properties") make different trade-offs between luminance and chrominance bandwidths as well as the crosstalk between them.

Most of the early CFAs as well as their associated image reconstruction algorithms were designs based on intuition and experimentation but lacking rigorous mathematical foundation. In the paper "Color demosaicing by estimating luminance and opponent chromatic signals in the Fourier domain", Proc. IS&T/SID 10th Color Imaging Conf, pages 331-336, 2002, D. Alleysson, S. Susstrunk, and J. Herault analyzed electromagnetic filtering performed by CFAs as amplitude modulation of the color signals in the spatial domain (as used herein the terms "demosaic" and "demosaick" are to be construed as input image reconstruction procedures and the terms "demosaicer" and "demosaicker" as input image reconstruction algorithms). This led to frequency domain image reconstruction techniques that viewed the problem as that of demultiplexing the luminance and chrominance signals via demodulation and filtering. See E. Dubois, "Frequency-domain methods for demosaicking of bayer-sampled color images", IEEE Signal Processing Letters, 12(12):847-850, 200 and N. Lian, L. Chang, and Y. P. Tan, "Improved color filter array demosaicking by accurate luminance estimation" in IEEE International Conference on Image Processing, 2005, ICIP 2005, volume 1, 2005.

The complementary problem of designing CFAs with good frequency domain properties was attacked by D. Alleysson, S. Susstrunk, and J. Herault, "Linear demosaicing inspired by the human visual system", IEEE Transactions on Image Processing, 14(4):439-449, 2005 wherein the doubling of the number of blue photosites in the Bayer CFA at the expense of Green photosites was suggested. This was followed by techniques to design CFAs directly in the frequency domain by K. Hirakawa and P. J. Wolfe, "Spatio-spectral color filter array design for enhanced image fidelity" in Proc. of IEEE ICIP, pages II: 81-84, 2007 and optimized by L. Condat, "A New Class of Color Filter Arrays with Optimal Sensing Properties". These techniques fix the pattern of each basic color to consist of a small set of spatial "carriers"—two dimensional sinusoids with appropriate frequencies, phases and amplitudes—and sum over the three basic colors to arrive at the final pattern. This pattern is then overlaid on the sensor. When an image formed by the camera's lens is filtered by the CFA, it is modulated by each of the carrier frequencies. The overlap of the modulation products of the 3 primaries induces a color transform and leads to a multiplex of luminance and chrominance signals modulated at different frequencies. As long as there is limited cross-talk between the luminance and chrominance signals, and the color transform is invertible the original color image can be recovered.

An important consideration in the choice of sensor color space so far has been the high frequency content of chrominance signals. Well chosen color transforms result in chrominance signals with low high frequency content. This allows the chrominance signals to be placed close to each other and to the luminance signal in the Fourier domain without significant cross-talk. See Y. Hel-Or, "The canonical correlations of color images and their use for demosaicing" and K. Hirakawa and P. J. Wolfe, "Spatio-spectral color filter array design for enhanced image fidelity" in Proc. of IEEE ICIP, pages II:

81-84, 2007 and L. Condat, "A New Class of Color Filter Arrays with Optimal Sensing Properties".

An important factor influencing the close packing of color component (luminance, chrominance) signals is the geometry of their spectra. Square and rectangular sampling lattices admit higher resolution along the diagonal directions than along horizontal or vertical directions. Optical systems, on the other hand, generate roughly equal resolution in all directions thereby yielding images with nearly circular spectral support. When plotted, the 2D Fourier transform of a CFA is a rectangle while that of a color component of an optical image is a circle. This leads to the problem of efficiently packing circles into rectangles. FIG. 3 shows an exemplary monochrome image 310 and it's spectral image 320. The spectral image is obtained by taking the logarithm of the absolute value of the Fourier transform of the image.

An aggressive class of techniques for close packing of color component spectra employs adaptive directional techniques during image reconstruction. These techniques assume the color component spectra of small image patches to be sparse in at least one direction. They design their CFA to generate more than one copy of chrominance spectra (see B. E. Bayer, "Color imaging array", Jul. 20, 1976, U.S. Pat. No. 3,971,065), implicitly or explicitly identify the cleanest copy during the image reconstruction step and use directional filtering to demultiplex them (see E. Dubois, "Frequency-domain methods for demosaicking of bayer-sampled color images", IEEE Signal Processing Letters, 12(12):847-850, 2005 and K. Hirakawa and T W Parks, "Adaptive homogeneity-directed demosaicing algorithm", IEEE Transactions on Image Processing, 14(3):360-369, 2005. Also see Ron Kimmel, "Demosaicing: Image reconstruction from color ccd samples", IEEE Trans. Image Processing, 8:1221-1228, 1999 and E. Chang, S. Cheung, and D. Y. Pan, "Color filter array recovery using a threshold-based variable number of gradients", in Proceedings of SPIE, volume 3650, page 36, 1999). The benefits of adaptive directional image reconstruction come at a heavy cost, though, since sensing edge directions from noisy sub-sampled images is a hard problem and the non-linear nature of sensing edges making makes noise reduction a non-separable step from image reconstruction.

Universal demosaickers have also been devised that can reconstruct images sampled by any CFA. This has allowed for easy experimentation with novel CFA designs, including patterns with basic colors arranged in a random pattern (as used herein the term "random" is to be construed as including "random" and "pseudo random").

CFA Design in the Fourier Domain

Consider a photosite located at $n=[n_1\ n_2]$ that filters incident light $x(n)=[x_r(n)\ x_g(n)\ x_b(n)]^T$ through color filter array $c(n)=[c_r(n)\ c_g(n)\ c_b(n)]^T$ and measures the resulting, scalar signal $y(n)$, where $$y(n)=c(n)\cdot x(n) \quad (1)$$

Consider a set of real carrier sinusoids $s^{(k)}(n)$, $1 \leq k \leq m$ of unit amplitude, frequencies $\omega^{(k)}=[\omega_1^{(k)},\omega_2^{(k)}]$ and phases $$\phi^{(k)} \in \{0, \frac{\pi}{2}\},$$

given by $$s^{(k)}(n) = \frac{e^{j(\omega^{(k)}\cdot n + \phi^{(k)})} + e^{-j(\omega^{(k)}\cdot n + \phi^{(k)})}}{2} \quad (2)$$

Each color of the CFA, $c_i(n)$, $i \in \{r, g, b\}$, is the superposition of these carriers scaled by an appropriate real amplitude $\alpha_i^{(k)}$, $$c_i(n) = \sum_{k=1}^{m} a_i^{(k)} s^{(k)}(n) \quad (3)$$

The choice of carrier frequencies is a CFA design decision except for the zero frequency or DC component, whose presence is essential for all physically realizable CFAs. For this reason we set $\omega^{(1)}=[0\ 0]$. It follows that $\alpha_i^{(1)}>0$, $i \in \{r, g, b\}$.

Once the sensor is exposed to image $x(n)$ and its mosaiced output $y(n)$ is captured, a signal processing step is needed to reconstruct $x(n)$. Assuming the carrier frequencies $\omega^{(k)}$, $1 \leq k \leq m$ are sufficiently separated so that sidebands centered about them do not overlap, each modulated signal can be recovered by multiplication with its respective carrier followed by convolution with a low pass filter $h^{(k)}$. Formally, $$u^{(k)}(n)=(h^{(k)}*(s^{(k)}\cdot y))(n) \quad (4)$$

Each $u^{(k)}(n)$, $0 \leq k \leq m$ can be viewed as a color component. Motivated by the fact that $\alpha_i^{(1)}>0$, $i \in \{r, g, b\}$, we loosely refer to $u^{(1)}(n)$ as the luminance signal, and $u^{(k)}(n)$, $k>1$ as the chrominance signals.

It is important to note that if the carrier frequencies $\omega^{(k)}$, $1 \leq k \leq m$ are insufficiently separated so that all sidebands centered about them overlap, existing techniques do not prescribe any means of recovering them without crosstalk.

Since $u(n)=[u^{(1)}(n)\ u^{(2)}(n)\ldots u^{(m)}(n)]^T$ is generated by the modulation of the incident image $x(n)$, it can be written as $$u(n)=A\cdot x(n) \quad (5)$$

where $$A = \begin{bmatrix} a_r^{(1)} & a_g^{(1)} & a_b^{(1)} \\ a_r^{(2)} & a_g^{(2)} & a_b^{(2)} \\ \vdots & \vdots & \vdots \\ a_r^{(m)} & a_g^{(m)} & a_b^{(m)} \end{bmatrix}.$$

A can be interpreted as the color transform matrix, and provided its rank is 3 or greater, x can be recovered by $$x(n)=A^{-1}\cdot u(n) \quad (6)$$

Here $A^{-1}$, the generalized inverse of A, can be interpreted as the inverse color transform.

From the above discussion it is clear that the three decision variables for a CFA design are the carrier frequencies $\omega^{(k)}$, $1 \leq k \leq m$, phases $\phi^{(k)}$, $1 \leq k \leq m$ and amplitudes given by the matrix A.

Bayer CFA in the Fourier Domain

For a Fourier domain analysis of the popular Bayer CFA see E. Dubois, "Frequency-domain methods for de-mosaicking of bayer-sampled color images", IEEE Signal Processing Letters, 12(12):847-850, 2005. FIG. 4 shows the Bayer CFA 410. FIG. 5 illustrates how color information with its circular support is packed into the sensor's rectangular support. This can be most easily understood in terms of an alternative color space:

$$\begin{bmatrix} L \\ C1 \\ C2 \end{bmatrix} = \frac{1}{4} \begin{bmatrix} 1 & 2 & 1 \\ -1 & 2 & -1 \\ -1 & 0 & 1 \end{bmatrix} \begin{bmatrix} R \\ G \\ B \end{bmatrix} \quad (7)$$

In FIG. 5, the central circle represents Luminance (L). The four quarter circles at the vertices make up Chrominance1 (C1). The two semi-circles at the left and right edges make up the first copy of Chrominance2 (C2a). The two semi-circles at the top and bottom edges make up the second copy of Chrominance2 (C2b).

It's apparent from this figure that there is empty space between circles that goes unused. Such inefficiencies are unavoidable by existing CFAs that attempt to maintain at least one copy of luminance or chrominance spectra free from crosstalk. This invention redresses such inefficiency, among other things.

Universal Demosaickers

A few so called universal image reconstruction methods exist which work with arbitrary Red, Green and Blue CFA patterns. These include one described in Condat, "Random patterns for color filter arrays with good spectral properties", (Research Report of the IBB, Helmholtz Zentrum Munchen, no. 08-25, September 2008, Munich, Germany), IBR, hereby incorporated by reference in its entirety, which uses variation minimization to infer the original image.

Lukac et al., "Universal demosaicing for imaging pipelines with a RGB color filter array" (Pattern Recognition, vol. 38, pp. 2208-2212, 2005) IBR, hereby incorporated by reference in its entirety, presents a universal demosaicker which makes assumptions about the local constancy of color ratios.

Neither of these universal demosaickers use spectral band-limitedness constraints in a systematic way.

BRIEF SUMMARY OF THE INVENTION

The present invention overcomes problems and limitations of prior imaging methods and systems by providing novel methods and systems for, among other things, sampling an image to obtain image data and processing image data.

One such method comprises receiving a sample set of data generated by transforming and sampling an optical property of an original color image in a spatial basis, wherein the transformation effected is substantially local in the spatial basis and has partially overlapping spectra. A generalized inverse of the transform is applied to the sample set of data to produce a set of inferred original image data, wherein the generalized inverse does not use variational minimization and does not assume constant color ratios.

Another such method comprises receiving a sample set of data generated by transforming and sampling an optical property of an original color image in a spatial basis, wherein the transformation effected is substantially local in the spatial basis and has partially overlapping spectra. A generalized inverse of the transform that respects predetermined spectral constraints is applied to the sample set of data to produce a set of inferred original image data.

Another such method comprises creating an optical color filter array, providing an image sensor comprising a plurality of photosensitive sensor elements, projecting an image through the color filter array, and detecting image intensity values transmitted through the color filter array after a single exposure at sensor elements of the image sensor. Detected intensity values are read out from only a subset of sensor elements to increase speed, the subset of sensor elements being randomly chosen whereby aliasing is rendered similar to noise. The input image is inferred from the detected image intensity values.

A further such method comprises creating an optical color filter array, providing an image sensor comprising a plurality of photosensitive sensor elements, projecting an image through the color filter array, and detecting image intensity values transmitted through the color filter array after a single exposure at each sensor element of the image sensor. The color filter array is random, whereby aliasing is rendered similar to noise. The sensor elements are grouped into two or more subsets whose respective characteristics differ in at least one of the following respects: sensitivities, sensor element quantum efficiencies and electronic signal integration times. The input image is inferred from the detected image intensity values.

Yet another such method comprises creating an optical color filter array, providing an image sensor comprising a plurality of photosensitive sensor elements, projecting an image through the color filter array, and detecting image intensity values transmitted through the color filter array after a single exposure at each sensor element of the image sensor. The sensor elements are arranged substantially in a jittered pattern. The input image is inferred from the detected image intensity values, while at least some higher frequency components of the detected image intensity values are set to zero prior to image inference.

Another such method comprises creating an optical color filter array, providing an image sensor comprising a plurality of photosensitive sensor elements,—projecting an image through the color filter array, and detecting image intensity values transmitted through the color filter array after a single exposure at each sensor element of the image sensor. The sensor elements are arranged substantially in a jittered pattern. The input image is inferred from the detected image intensity values, where sparsity promotion is used to reconstruct a higher resolution image.

A method for sampling an image comprises projecting an image onto an image sensor comprising a plurality of photosensitive sensor elements arranged in a pattern obtained by jittering the pixel locations a small distance off of a regular lattice in a random way and and detecting image intensity values after a single exposure at each sensor element of the image sensor. The input image is inferred from the detected image intensity values.

Another such method is provided for reducing noise in an image. This method comprises receiving a sample set of data generated by transforming and sampling an optical property of an original color image in a spatial basis, wherein the transformation effected is substantially diagonal in the spatial basis and has partially overlapping spectra and approximating the Poissonian photon shot noise at each photosite with a Gaussian of the same variance and zero mean. The image intensity at each photosite is used as an approximation for the mean of the Poissonian at the photosite. The Gaussian of the same variance and zero mean is combined with the Gaussian noise from other sources to get a combined Gaussian. The maximum likelihood estimator of the combined Gaussian is computed.

A further such method is provided for reducing noise in an image. This method comprises capturing image data representative of intensities of the image in the spatial domain, transforming the image data into transformed data in another domain, and applying the Expectation Maximization algorithm to the inverse transformation of the data to compute its maximum likelihood estimator.

An additional such method is provided for computing a sparse representation of a signal in a basis. This method comprises inserting additional vectors from the basis into the sparse representation in multiple iterations and using a statistical estimator such as a maximum likelihood estimator to decide which additional vectors to include in each iteration.

Yet another such method is provided for processing an image. It comprises receiving a sample set of data generated by transforming and sampling an optical property of an original color image in a spatial basis, wherein the transformation effected is substantially diagonal in the spatial basis and has partially overlapping spectra. A generalized inverse of the transformation is applied to the sample set of data to produce a set of inferred original image data, wherein the sampling is done at spatial locations which are arranged substantially in a jittered pattern.

It is to be understood that this summary is provided as a means of generally determining what follows in the drawings and detailed description, and is not intended to limit the scope of the invention. Other methods and systems are disclosed and claimed herein and those described above should not be construed as exhaustive or limiting. Objects, features and advantages of the invention will be readily understood upon consideration of the following detailed description taken in conjunction with the accompanying drawings.

BRIEF DESCRIPTION OF THE DRAWINGS

FIG. 3 Shows a monochrome image and it's spectral image.

FIG. 8 is a code listing of a Matlab simulation of an exemplary embodiment of the invention showing image reconstruction by matrix inversion.

FIG. 10 is a code listing of a Matlab simulation of an exemplary embodiment of the invention showing image reconstruction with sparsity promotion.

DETAILED DESCRIPTION OF THE INVENTION

The present invention works within the broad framework of Color Filter Array based color imaging systems.

Figure 1:
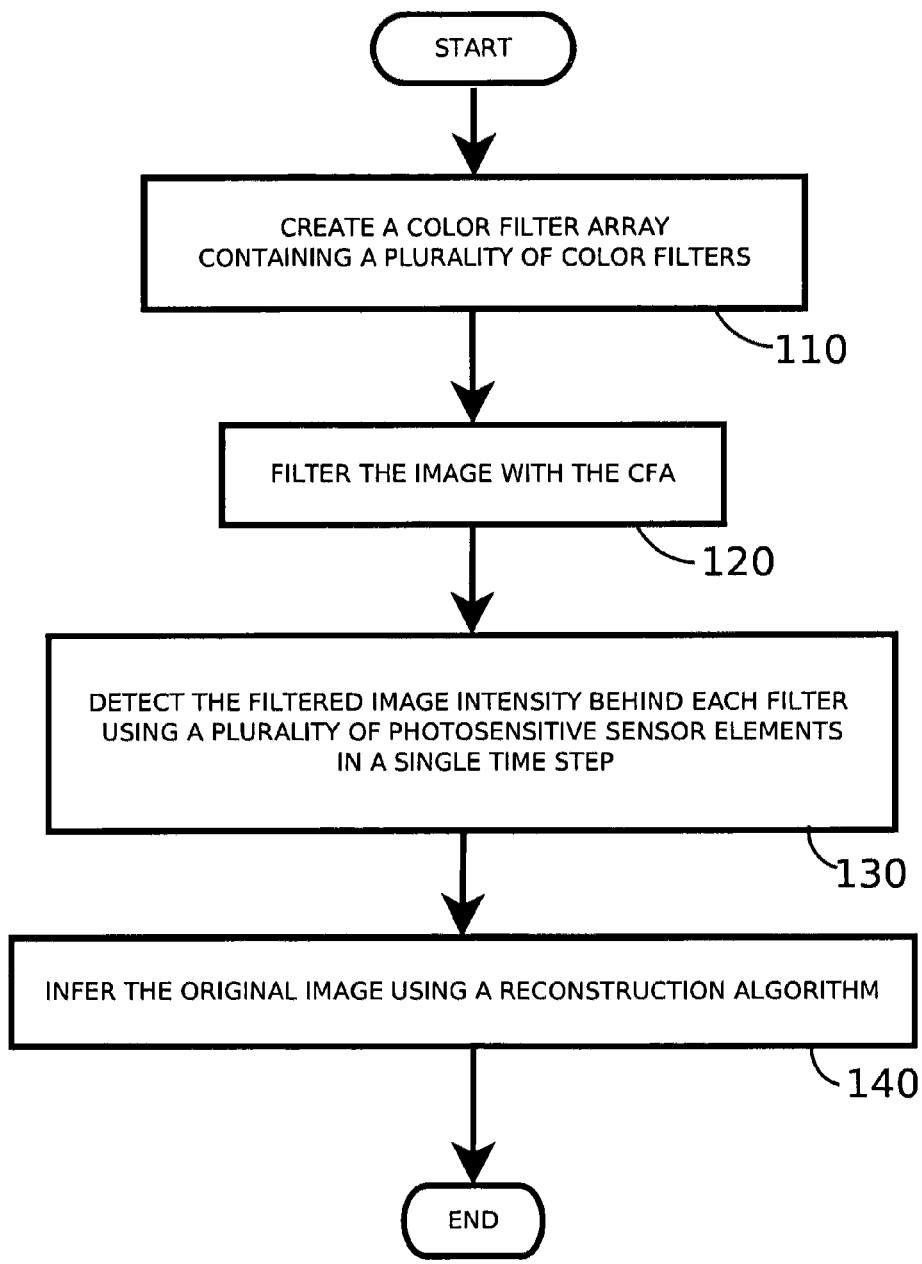
FIG. 1 is a flowchart showing an exemplary method for sampling a color image with a CFA in accordance with an embodiment of the present invention.

FIG. 1 is a flowchart showing an exemplary method of color imaging, in accordance with an embodiment of the present invention. In step 110, a Color Filter Array is created. In step 120, the incident image is filtered through this CFA. In step 130, the filtered image is detected by an image sensor after it is exposed to it. In step 140, the image is reconstructed from the image sensor output and the CFA pattern.

Figure 2:
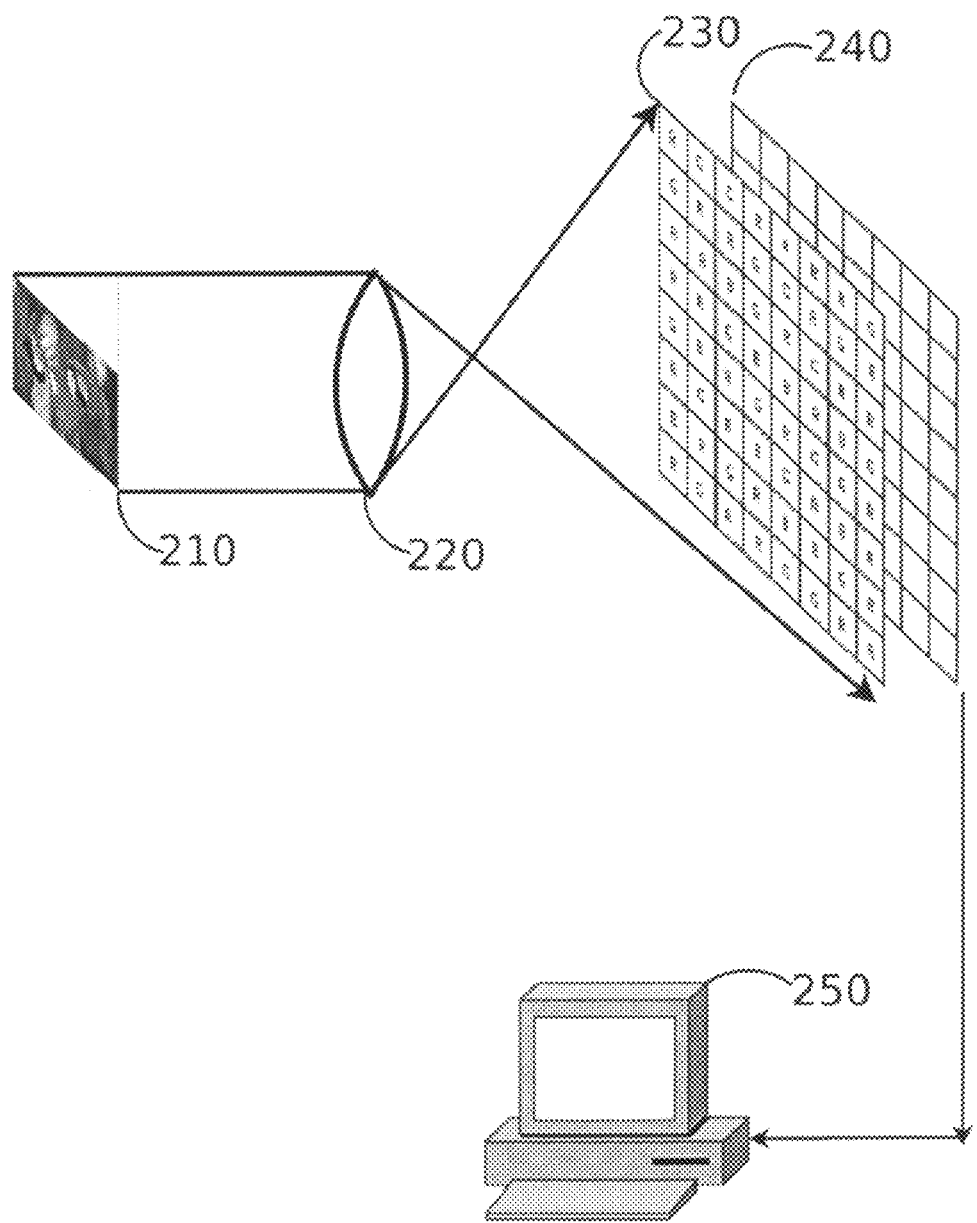
FIG. 2 is a schematic diagram of an exemplary color imaging system in accordance with an embodiment of the present invention.
Figure 4:
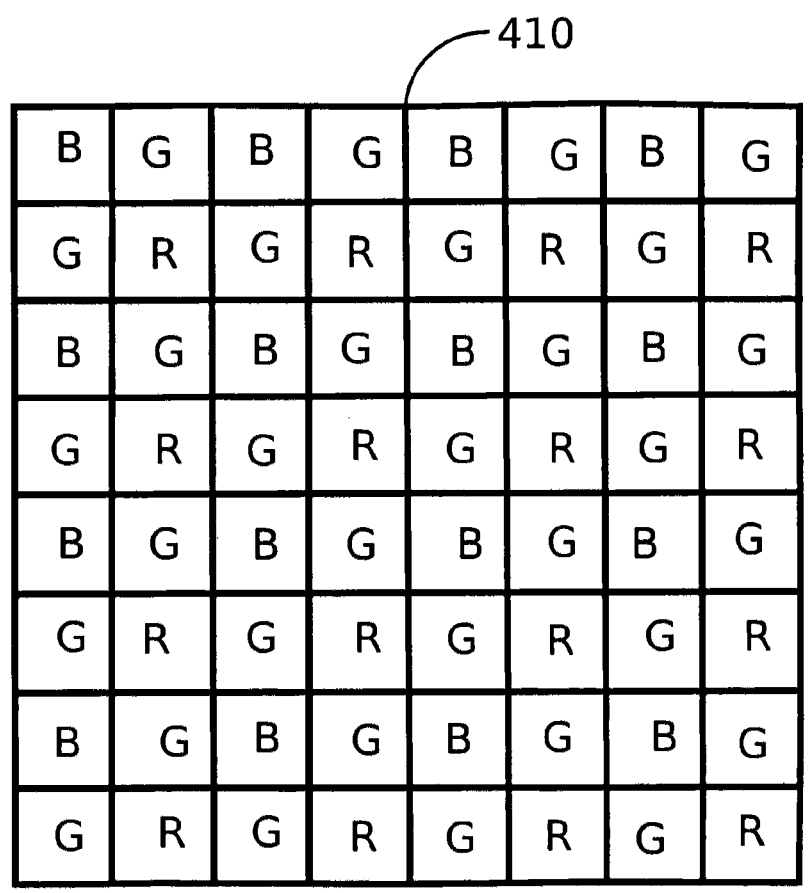
FIG. 4 Shows the popular Bayer Color Filter Array.
Figure 5:
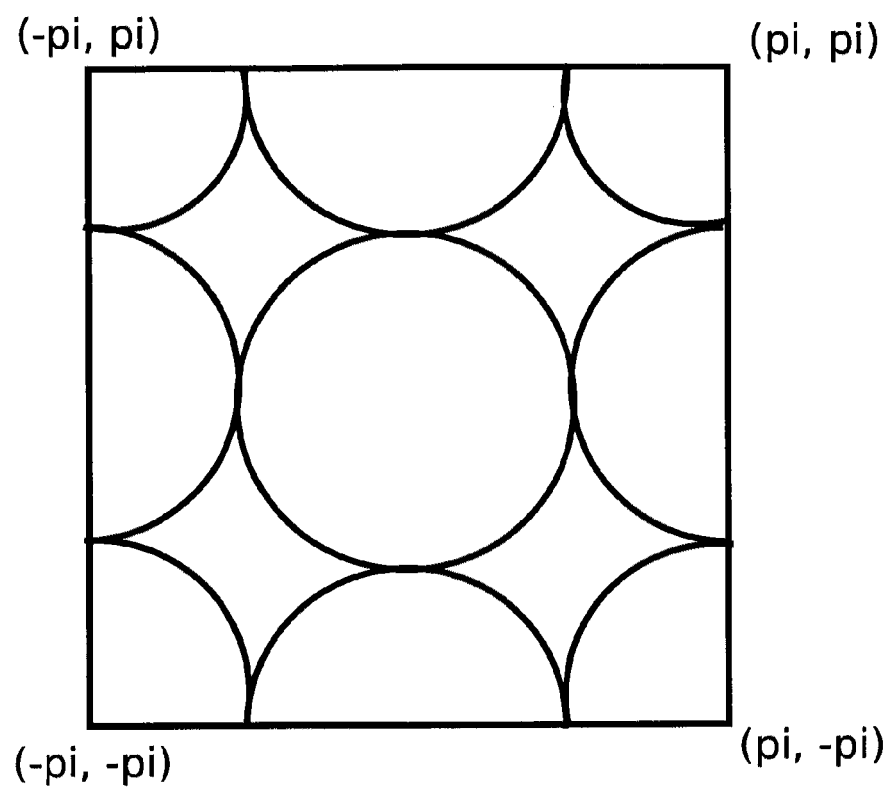
FIG. 5 Illustrates amplitude modulation of an image effected by the Bayer CFA.

FIG. 2 is a schematic diagram of an imaging system, in accordance with an embodiment of the present invention. Image 210 is focused by lens 220 onto Color Filter Array 230. The filtered image is detected by image sensor 240. The resulting plurality of sensed filtered image intensity values is sent to processor 250 where image reconstruction is performed.

Existing CFA designs try to minimize partial spectral overlap between the different color components, or use empirically designed techniques to reconstruct the image. A novel feature of the present invention is the use of mathematically rigorous techniques that separate the color components during image reconstruction even if they have partial spectral overlap. As before, we define the overlap of two modulated spectra (including the degenerate 0 frequency) as partial if they have different carrier frequencies, and total otherwise.

A General Image Capture Problem Formulation

Consider a discrete image with $(N_1, N_2)$ pixels. Denote the R, G, B color planes of the image by $x_i$, $i \in \{r, g, b\}$ and those of the CFA that filters it by $c_i$, $i \in \{r, g, b\}$. Now, a photosite located at $n=(n_1, n_2)$, $1 \leq n_1 \leq N_1$, $1 \leq n_2 \leq N_2$ filters the incident light $x(n) = [x_r(n)\ x_g(n)\ x_b(n)]$ through color filter array $c(n) = [c_r(n)\ c_g(n)\ c_b(n)]$ and measures the resulting noise-free, scalar signal $y(n)$, where $$y(n) = c(n) \cdot x(n) \tag{8}$$

Taking $(N_1, N_2)$ point 2D DFT of both sides of equation 8 we get, $$Y = \sum_{i \in \{r,g,b\}} C_i * X_i \tag{9}$$

where $Y$, $C_i$, $X_i$, $i \in \{r, g, b\}$ are the 2D DFT of $y$, $c_i$, $x_i$, $i \in \{r, g, b\}$ respectively and * represents 2D convolution. We define "rasterization" of a 2 dimensional signal into a vector as first casting each row of the signal as a vector and then concatenating these vectors in the order of the rows. In order to cast equation 9 in matrix form, we first define $\tilde{Y}, \tilde{X}_i, \tilde{C}_i$, $i \in \{r, g, b\}$ as the rasterized column vector versions of $Y, X_i, C_i$, $i \in \{r, g, b\}$ respectively and $$\tilde{X} \equiv \begin{bmatrix} \tilde{X}_r \\ \tilde{X}_g \\ \tilde{X}_b \end{bmatrix}$$

as the concatenation of $\tilde{X}_r, \tilde{X}_g, \tilde{X}_b$. Furthermore, denote DFT frequencies of the input image by $\omega = (\omega_1, \omega_2)$ and those of the CFA filtered image by $\Omega = (\Omega_1, \Omega_2)$ and their rasterized version as $\tilde{\omega}$ and $\tilde{\Omega}$ respectively. Now equation 9 can be re-written in matrix form as $$\tilde{Y} = A \cdot \tilde{X} \tag{10}$$

where row $\tilde{\Omega}$ of A is the concatenation of $\tilde{D}_i(\tilde{\Omega})$, $i \in \{r,g,b\}$, $$A(\tilde{\Omega}) \equiv [\tilde{D}_r(\tilde{\Omega}) \tilde{D}_g(\tilde{\Omega}) \tilde{D}_b(\tilde{\Omega})] \tag{11}$$

and $\tilde{D}_i(\tilde{\Omega})$, $i \in \{r, g, b\}$ is a row vector obtained by appropriately rearranging the elements of $\tilde{C}_i^T$, $i \in \{r, g, b\}$ so as to effect the convolution of equation 9.

In order to solve equation 10, we require rank(A)=$|\tilde{X}|$. However, rank(A)$\leq$min($|\tilde{X}|,|\tilde{Y}|$) and the number of sensor elements, $|\tilde{X}|$ is k times $|\tilde{Y}|$, in the case k basic colors. Hence $\tilde{X}$ can only be recovered if an image model exists that provides additional a priori information, such as restricted signal bandwidth, or sparse representation in some bases. Thus, equation 10 has to be augmented with $$\Gamma = A' \cdot \tilde{X} \tag{12}$$

where $\Gamma$ is a vector typically composed of constants, usually zeros. Combining equations 10, 12 we obtain $$\tilde{X} = S^{-1} \cdot Y' \tag{13}$$

where $$Y' = \begin{bmatrix} \tilde{Y} \\ \Gamma \end{bmatrix}$$

is the concatenation of $\tilde{Y}$, $\Gamma$, $$S = \begin{bmatrix} A \\ A' \end{bmatrix}$$

is the concatenation of A, A' and $S^{-1}$ is the generalized inverse of S.

In order to express the result of 10 in the spatial domain first consider equation 8. Let the rasterized column vector versions of y and the color planes of x, c be $\tilde{y}, \tilde{x}_i, \tilde{c}_i, i \in \{r, g, b\}$. Let $$\tilde{x} \equiv \begin{bmatrix} \tilde{x}_r \\ \tilde{x}_g \\ \tilde{x}_b \end{bmatrix}$$

be a column vector formed by the concatenation of $x_i$, $i \in \{r, g, b\}$ and $B = [\tilde{c}_r \ \tilde{c}_g \ \tilde{c}_b]$ be a matrix similarly formed by the concatenation of $\tilde{c}_i$, $i \in \{r, g, b\}$. Equation 8 can now be re-written as, $$\tilde{y} = B \cdot \tilde{x} \quad (14)$$

Analogously to the Fourier domain formulation, to solve equation 14 we require rank(B)=|x̃|. However, rank(B)≤min (|x̃|,|ỹ|) and the number of sensor elements, |x̃| is k times |ỹ|, in the case k basic colors. Hence x̃ can only be recovered if an image model exists that provides additional a priori information, such as restricted signal bandwidth, or sparse representation in some bases. Thus, equation 14 has to be augmented with $$\gamma = B' \cdot \tilde{x} \quad (15)$$

where γ is a vector typically composed of constants, usually zeros. Combining equations 14, 15 we obtain $$\tilde{x} = S^{-1} \cdot y' \quad (16)$$

where $$y' = \begin{bmatrix} \tilde{y} \\ \gamma \end{bmatrix}$$

is a concatenation of $\tilde{y}$, $\gamma$, $$S = \begin{bmatrix} B \\ B' \end{bmatrix}$$

is a concatenation of B, B' and $S^{-1}$ is a generalized inverse of S.

We use the term "Generalized Inverse" to refer to transformations that have some or all properties of an inverse transformation. If a transform is invertible, its generalized inverse refers to this inverse or any transform that results in an inferred image that is sufficiently close to it in $L_2$ norm. If the transform is not invertible, its generalized inverse is obtained by adding additional conditions such as image smoothness or sparsity. If the inverse transform is over determined, the generalized inverse may use statistical estimation to choose the most probable solution from the space of possible solutions.

From equation 16 we find that a basic color value at a pixel location can be computed as a weighted sum of elements of y'. Since the only image dependent values of y' are in its sub-vector ỹ, this reduces to a space variant filter plus an optional constant. This constant is 0 if γ is a vector of zeros. The space variant filter obtained from equation 16 has a large kernel the size of |ỹ|. In practical systems, this can be greatly reduced by windowing the filter kernel. Alternately, equation 16 can be set up for a small block around each pixel and only the kernel for this pixel solved for. The latter method not only generates small kernels, but does so with greatly reduced offline computation.

Another practical consideration is the space required to store the space variant filter kernels. This can be addressed by using a periodic CFA formed by tiling the sensor with a pattern block, so that the number of filter kernels is reduced to the block size. Such tiling sufficiently preserves the random character of a random CFA as long as the block size is not too small. Rectangular blocks suffice for most applications but other, more complicated, shapes may also be employed.

Space variant filter kernels can be pre-computed and used for image reconstruction only if equation 12 or 15 can be set up independently of the image. This is the case for section "Image Model with Restricted Bandwidth" but not for sections "Image Model with Transform-coefficient Sparsity" and "Other Regularization Techniques for Image Reconstruction". Hybrid approaches that combine space variant filters with adaptive algorithms are described in section "Image Model with Adaptive Color Space and Bandwidth."

Designing CFAs to Convey Maximal Information

The rank of matrix A is determined by the choice of CFA. A carefully tailored CFA with a small repeating pattern can have a rank close to or equal to |Ỹ|. However, such CFAs have a large number of filter colors complicating their manufacture. Filters that allow the transmission of more than one basic color are known as panchromatic filters. Panchromatic filters vary in the amount of transmission of each basic color and hence come in a large number of colors.

We present, without proof, the result that CFAs comprised of a random arrangement of basic colors such as Red, Green and Blue (known collectively "RGB") filters have rank close to |Ỹ|. Furthermore, some random arrangements of the basic colors can have a rank equal to |Y|. Intuitively, this is due to the fact that the DFT of a random pattern is overwhelmingly likely to contain |Ỹ| carrier frequencies of non-zero amplitude. Furthermore, practically all of these amplitudes are unique. Such CFAs are easier to manufacture than panchromatic ones. For more on eigenvalues of random matrices, see E. J. Candes, T. Tao, "Near Optimal Signal Recovery From Random Projections: Universal Encoding Strategies?", IEEE Transactions on Information Theory, 2006 and references cited therein.

Randomized Panchromatic CFAs can also be built wherein colors are chosen randomly. Such CFAs also have rank concentrated close to |Ỹ|. However, these are harder to manufacture than random basic-color filter arrays.

Figure 6:
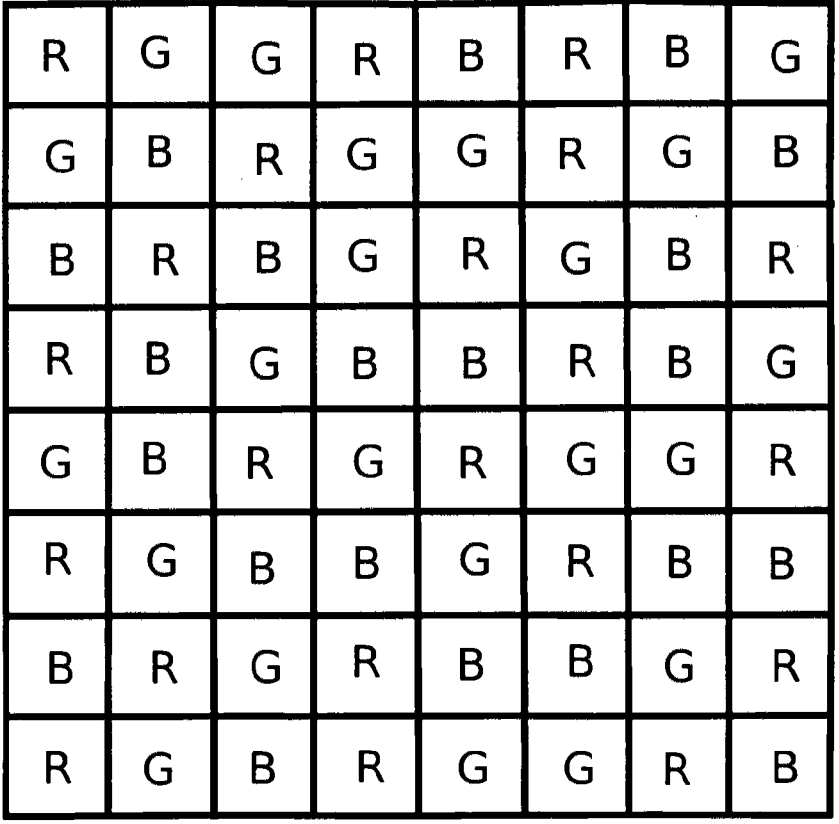
FIG. 6 is a diagram of an exemplary randomized color filter array in accordance with an embodiment of the present invention.

FIG. 6 shows an exemplary Color Filter Array 610, in accordance with an embodiment of the present invention. In this example Red, Green and Blue filters in approximately equal numbers are distributed in a random pattern.

Figure 7:
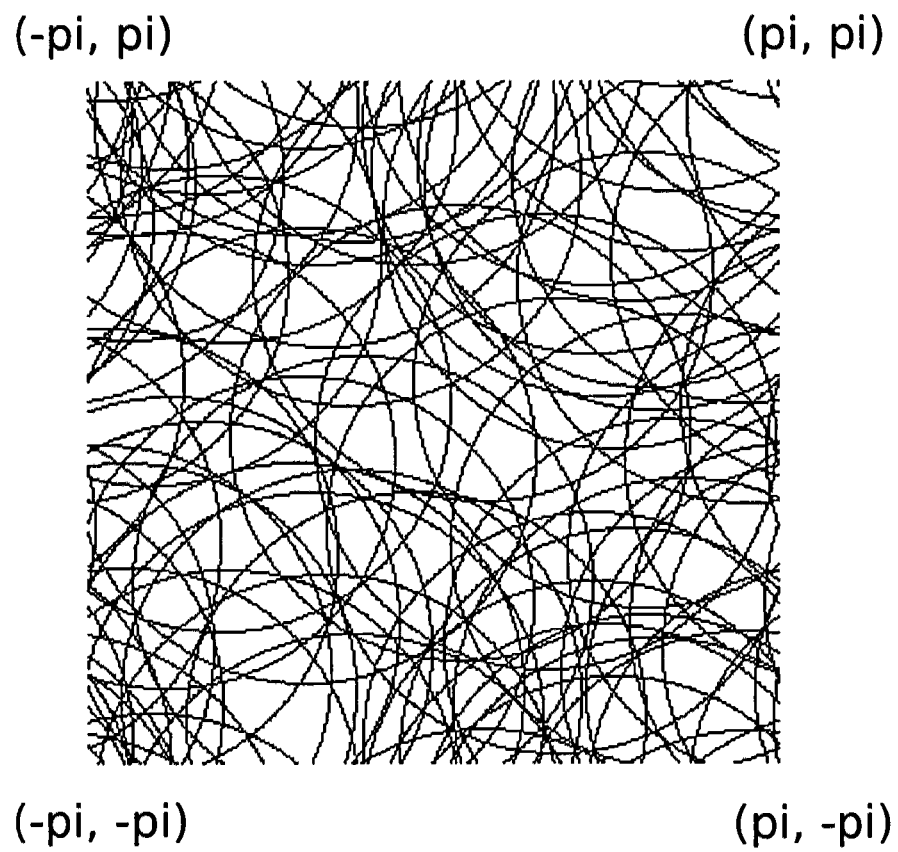
FIG. 7 Illustrates amplitude modulation of an image effected by the CFA shown in FIG. 6 in the Fourier domain.

FIG. 7 Illustrates amplitude modulation of an image effected by the CFA shown in FIG. 6 in the Fourier domain.

Each circle represents the spectrum of a basic color signal modulated with one of the multitude of carriers. For better visibility, only a few of the carriers are shown.

In more general terms, we shall refer to the linear transform effected by a CFA or other optical transformation apparatus as a λ-Capture transform if it has the following property when applied to a band-limited color image signal with color space dimensionality k: If the signal has circular Fourier domain support with 1/k as many independent Fourier coefficients in each color as the number of Fourier coefficients in the transformed signal, then λ% of the latter are independent linear combinations of the former. The parameter λ of a λ-Capture transform controls the rank of the inverse transform and is a measure of the amount of color information captured in the transformed signal.

Random CFAs and Graceful Error Handling

Information injected via equation 12 in the Fourier domain or 15 in the spatial domain may not be accurate, and thereby result in image reconstruction errors. This error is dependent on the CFA, and using a random CFA randomizes the error. Randomized error is more similar to noise than non-randomized error and is visually less objectionable. Furthermore, randomized error lacks transform coefficient sparsity and is more amenable to standard noise reduction techniques. This removes a significant part of the error signal while eliminating very little of the image information.

Image reconstruction algorithms for random CFAs make very few assumptions about arrangement of photosites of any given color, and hence can be easily adapted to work around defective photosites. The resulting error is randomized, made visually less objectionable and amenable to noise reduction.

Image Model with Restricted Bandwidth

To apply bandwidth restrictions in the spatial domain, first consider a $N_1$, $N_2$ point 2D DFT matrix F whose row $F(\tilde{\omega})$ determines the DFT coefficient of frequency $\tilde{\omega}$ of color i when multiplied with $\tilde{x}_i$, $i \in \{r, g, b\}$. Also consider a color transform with k components $\alpha^{(j)}$, $1 \le j \le k$ that are linear combinations of the primary colors r, g, b thus defined:

$$\alpha^{(j)} = \alpha_r^{(j)} r + \alpha_g^{(j)} g + \alpha_b^{(j)} b \quad (17)$$

where k is usually 3. Next, define $G^{(j)} = [\alpha_r^{(j)} F \; \alpha_g^{(j)} F \; \alpha_b^{(j)} F]$ by scaling and concatenating 3 copies of F so that it computes the DFT of color component $\alpha^{(j)}$ when multiplied by $\tilde{x}$. Set up equation 15 by letting matrix B' consist of rows $G^{(j)}$, $1 \le j \le k$ that represent the DFT coefficients of color components to be set to zero, and letting γ be a column vector of p zeros where p is the number of rows of B'.

The color signal bandwidth restriction of the previous paragraph can equally well be written in the Fourier domain formulation by appropriately setting up equation 12.

The color signal bandwidth restriction can also be applied in the Wavelet, Curvelet, Karhunen-Loeve and other bases where it results in many low value coefficients that can be approximated to zero.

Well chosen color spaces contain most of their high frequency energy in their luminance signal and very little in their chrominance signals. This allows images to be approximately modeled with chrominance bandwidths that are a fraction of their luminance bandwidths with little error. If random CFAs are used, this error is randomized and rendered less visually objectionable and made amenable to noise reduction.

One such color space containing chrominance signals with low high frequency content is defined in terms of luminance (l), chrominance1 (c1) and chrominance2 (c2) as follows:

$$\begin{bmatrix} l \\ c1 \\ c2 \end{bmatrix} = \begin{bmatrix} \frac{1}{\sqrt{3}} & 0 & 0 \\ 0 & \frac{1}{\sqrt{2}} & 0 \\ 0 & 0 & \frac{1}{\sqrt{6}} \end{bmatrix} \begin{bmatrix} 1 & 1 & 1 \\ 1 & -1 & 0 \\ 1 & 1 & -2 \end{bmatrix} \begin{bmatrix} R \\ G \\ B \end{bmatrix} \quad (18)$$

It has been shown by Y. Hel-Or, "The canonical correlations of color images and their use for demosaicing," HP Laboratories Israel, Tech. Rep. HPL-2003-164R1, February 2004 that c1, c2 and l can be considered statistically independent.

While the above definition of luminance is the preferred one, other definitions of chrominance may be used. Chrominance basis vectors that are orthogonal to the luminance basis vector defined above have similarly low high frequency content.

All techniques described in this section allows one to set up equation 12 or 15 independently of the input image, and image reconstruction can be performed with a pre-computed space variant filter.

Image Model with Adaptive Color Space and Bandwidth

Color spaces can be adaptively chosen for different image neighborhoods so as to minimize high frequency content of chrominance signals. For example, this can be done by pre-multiplying each basic color by a factor inversely proportional to its strength in the neighborhood, reconstructing the thus normalized image followed by de-normalization to restore the original colors.

Signal bandwidth can be adaptively set for each image neighborhood. Consider the vicinity of an edge, for example. Signal bandwidth along the direction of the edge is lower than in the direction perpendicular to it. Edge sensing algorithms can be used to take advantage of this fact, for example, and setup equation 12 or 15 with a roughly oval spectrum with major axis in the direction of the edge. This allows for the reconstruction of higher resolution images and makes the system of equations more over determined and thus robust to noise.

If a limited number of color spaces and a limited number of spectral shapes are considered, their solutions can be precomputed as space variant filters. Image reconstruction then consists of selecting the most suitable color space and spectral shape for each neighborhood, and applying the corresponding space variant filter.

Image Model with Transform-Coefficient Sparsity

Spectral sparsity of natural images may be used to reduce the number of degrees of freedom. In this framework, explicitly or implicitly, most of the large amplitude transform coefficients (as used herein the term "transform coefficient" is to be construed as including "Fourier transform coefficient", "Wavelet transform coefficient", "Curvelet transform coefficient", "Karhunen-Loeve transform coefficient" and coefficients of other vector bases spanning the space of image signals) of color components are solved for, and many of the low amplitude coefficients are neglected. If many of the low amplitude transform coefficients are first identified and set to zero, the resulting simplified inverse problem can be solved using any of the standard linear inverse problem techniques.

A random CFA is well suited to our objective of extracting the large valued Transform coefficients as it provides a random set of projections of the image. See E. J. Candes, T. Tao, "Near Optimal Signal Recovery From Random Projections:

Universal Encoding Strategies?", IEEE Transactions on Information Theory, 2006. Random CFAs will be assumed for the rest of this section.

The low value transform coefficients can be identified by first reconstructing an appropriately bandwidth restricted image. This works because the neglected high frequencies have low magnitudes compared to the low frequencies (see D. L. Ruderman and W. Bialek, "Statistics of natural images: Scaling in the woods", Physics Review Letters 73 (1994), no. 6, 814-817). Furthermore, the resulting error is randomized and the resulting dense spectral support of the error results in small value transform coefficients remaining small. Once the low value transform coefficients are identified and removed, higher frequency coefficients are reintroduced and the resulting linear problem re-solved. This process is repeated until all "large" transform coefficients are identified and solved for.

$L_1$ minimization, also known as Basis Pursuit, is a standard Compressive Sensing technique to identify many of the high amplitude transform coefficients—and thereby the low amplitude transform coefficients. See Chen, Donoho, and Saunders, "Atomic decomposition by basis pursuit", SIAM J. Scientific Computing, vol. 20, pp. 33-61, 1999.

Matching Pursuit is a faster but suboptimal greedy algorithm for identifying the large valued transform coefficients. See Mallat and Zhang, "Matching Pursuits with Time-Frequency Dictionaries", IEEE Transactions on Signal Processing, December 1993, pp. 3397-3415. Variants include, but are not limited to, Orthogonal Matching Pursuit, Regularized Orthogonal Matching Pursuit and Simultaneous Orthogonal Matching Pursuit.

We propose a modification of greedy iterative sparsity promoting techniques such as Matching pursuit and its variants wherein at each iteration, a statistical estimator such as a Maximum Likelihood Estimator (MLE) is used for determining which additional basis vector to add to the sought sparse representation. Various statistical estimators are discussed in a later section on noise sensitivity. The use of statistical estimators produces a more accurate sparse representation.

Correlations between the images in the three basic colors can also be leveraged to further increase sparsity allowing more frequencies to be recovered, thereby improving reconstruction quality. Instead of promoting sparsity of the image in each of the basic colors independently, sparsity is sought in a joint representation. See Nagesh and Li, "Compressive imaging of color images", IEEE Int. Conf. on Acoustics, Speech and Signal Processing (ICASSP), Taipei, Taiwan, April 2009. Unlike our CFA based approach, the authors of this prior work use a color wheel and a Digital Mirror Device thereby freeing them to choose any measurement basis but adding significantly to the cost of such a device and requiring multiple exposures to obtain a single image.

The band limitedness of the image can be imposed on each iteration of the solution by projecting the iterate onto the corresponding convex set.

Since natural images have approximate transform coefficient sparsity not exact transform coefficient sparsity, the above reconstruction techniques are not exact. However, since image compression techniques such as JPEG, JPEG2000, JPEG-XR, MPEG1, MPEG2, MPEG4 ASP, AVC, H.263, H.264, AVS, VC-1, WebP, WebM, Theora, Dirac etc. are also based on similar models of transform sparsity, this inaccuracy does not significantly contribute to any additional image degradation.

Transform sparsity image model can be used in conjunction with limited bandwidth image model to reconstruct the input image. This allows larger bandwidth images to be reconstructed than is possible with only the limited bandwidth model or, for that matter, with state of the art image reconstruction algorithms. This, in turn, allows for larger bandwidth OLPFs to be used or for OLPFs to be omitted altogether.

Noise Sensitivity

Noise has two primary components: a) additive Gaussian noise generated at the sensor due to thermal and electrical effects and b) Poissonian photon-shot noise which we approximate by a Gaussian of the same variance and zero mean. Naive CFA designs when combined with simplistic matrix inversion for image reconstruction can often lead to amplification of this noise in the reconstructed image.

$$S(\tilde{\Omega}) \cdot \tilde{X} + \epsilon(\tilde{\Omega}) = Y_\epsilon(\tilde{\omega}) \qquad (19)$$

where $Y_\epsilon(\tilde{\Omega})$ is the noisy signal output by the sensor for frequency $\omega$, $\epsilon(\tilde{\omega})$ is a random variable representing noise, and $S(\tilde{\Omega})$ is the corresponding row of the matrix S. For the noisy case, equation 13 can be rewritten as $$\tilde{X}_\epsilon(\tilde{\omega}) = \sum_\Omega S^{-1}(\tilde{\omega}, \tilde{\Omega}) \cdot Y_\epsilon(\Omega) \qquad (20)$$

where $\tilde{X}_\epsilon(\tilde{\omega})$ is the noisy reconstruction of $\tilde{X}(\tilde{\omega})$.

$$\text{var}(\tilde{X}_\epsilon(\tilde{\omega}) - \tilde{X}(\tilde{\omega})) = \sum_\Omega \left(S^{-1}(\tilde{\omega}, \tilde{\Omega})\right)^2 \cdot \text{var}(\epsilon(\tilde{\Omega})) \qquad (21)$$

where $\epsilon(\tilde{\omega})$ is assumed to be uncorrelated and var(.) represents variance. Now, we can express Signal to Noise Ratio as $$SNR = 10\log\frac{\tilde{X}^2(\tilde{\omega})}{\text{var}(\tilde{X}_\epsilon(\tilde{\omega}) - \tilde{X}(\tilde{\omega}))} = 10\log\frac{\sum_\Omega \left(S^{-1}(\tilde{\omega}, \tilde{\Omega}) \cdot \tilde{Y}_\epsilon(\tilde{\Omega})\right)^2}{\sum_\Omega \left(S^{-1}(\tilde{\omega}, \tilde{\Omega})\right)^2 \cdot \text{var}(\epsilon(\tilde{\Omega}))} \qquad (22)$$

This scheme becomes susceptible to noise amplification if the choice of CFA is such as to make some elements of $S^{-1}(\tilde{w}, \tilde{\Omega})$ large in magnitude or negative. Multiplication of signals with large values amplifies noise while subtraction of strong signals to obtain a weak residual signal decreases SNR as noise energy gets added even as the signal gets subtracted. These problems may be ameliorated by suitably designing CFAs and the image reconstruction algorithms.

CFA Designs with Reduced Noise Amplification

Noise amplification can be reduced by employing a slightly larger photosite count that results in a more overdetermined systems of linear equations. Many reconstruction algorithms perform better on such over-determined systems of linear equations.

Low amplitude carriers in the CFA result in low amplitude sidebands. These low amplitude sidebands are amplified by the inverse color transform of the reconstruction step, which amplifies noise as well. CFAs should be designed so that the sum of all carrier energies is high.

One effective design strategy is ensure that photosites of different colors are well mixed. This prevents large numbers of photosites of the same color from clumping together, thus ensuring each pixel has photosites of all colors in its vicinity. This works well because most image reconstruction algorithms are better at interpolating missing colors over small distances than they are at interpolating them over large distances. Random CFAs with this property can be generated by setting the probability distribution of picking a color at a photosite as a function of the colors of other photosites in its neighborhood.

One way of designing CFAs with minimal subtractions while maintaining high efficiency of frequency-packing is to use a small number of carriers resulting in panchromatic filters i.e. filters with a large gamut of colors.

Reducing Noise Amplification During Image Reconstruction

Enforcing spectral sparsity is an effective technique for suppressing noise. This is done using the techniques of section "Image Model with Transform-coefficient Sparsity". This leads to the linear system of equations being over determined and hence a substantial improvement in Signal to Noise Ratio.

Statistical estimation techniques form another effective class of noise suppression techniques. Statistical Estimation is the term used to describe techniques for estimating the parameters of a probabilistic distribution from a set of samples from that distribution. In the case of an over-determined system of equations, statistical estimation can be used to approximate the means of distributions that generated the sensor readings. Least squares regression is one of the simplest forms of statistical estimation. Various other estimators may also be computed on over-determined systems such as the Maximum Likelihood Estimator (MLE), Maximum A Posteriori Probability (MAP) estimator, Best Linear Unbiased Estimator or a Minimum Variance Linear Estimator. For details, see J. Shao, "Mathematical Statistics", Springer, ISBN 0-387-98674-X (1998).

A Matlab simulation was performed wherein a CFA with equal numbers of Red, Green and Blue filters arranged in a random pattern was generated. The original color image was filtered through this CFA. Various amounts of white noise was added to this and reconstruction was performed on the resultant image sensor output by inverting the linear transformation effected by the CFA in the Fourier domain. Matlab is a product of The Math Works, Inc., Natick, Mass., U.S.A.

FIG. 8 shows a snippet of Matlab code used in the simulation. While we do not provide a complete code listing of the simulation, this snippet should be sufficient for anyone of ordinary skill in the art to reproduce our results. The matrix inversion step of the reconstruction is performed by the Moore-Penrose pseudoinverse algorithm.

Figure 9:
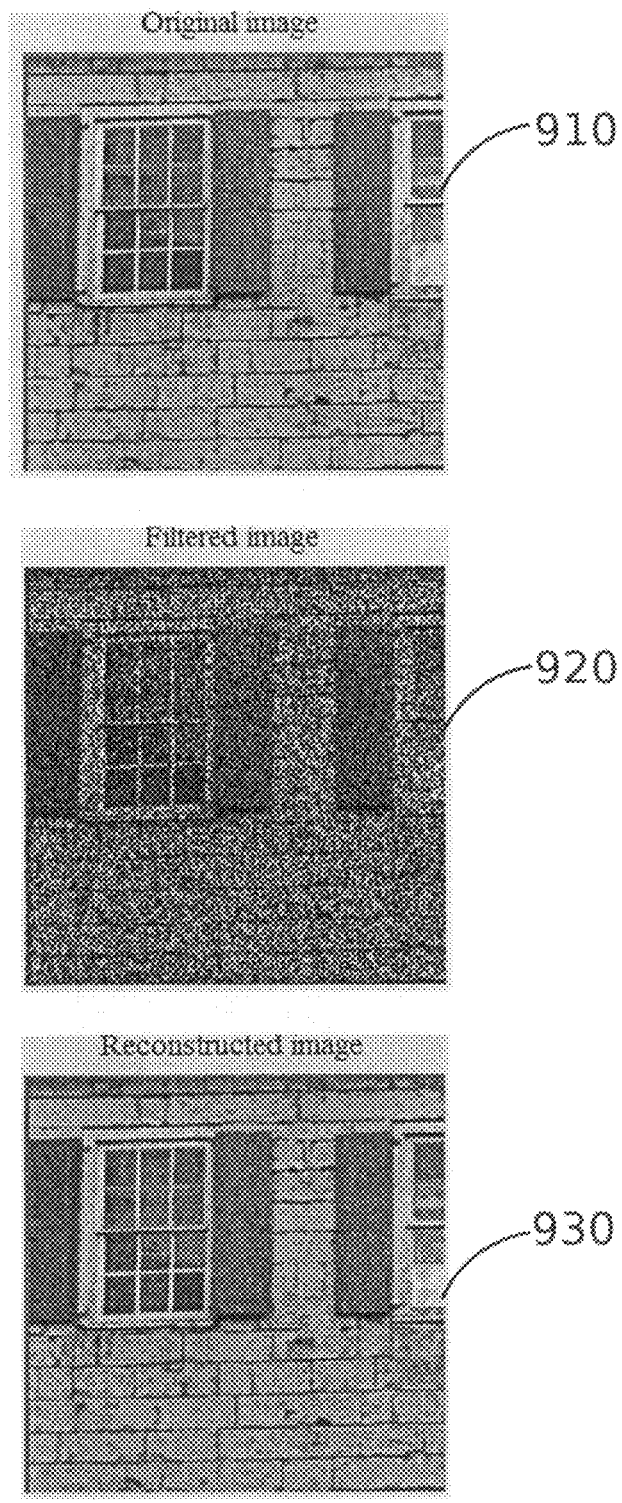
FIG. 9 Shows the results of a simulation of a simple exemplary embodiment of the present invention in Matlab.

FIG. 9 shows the results of this simulation. 910 is the original color image. 920 is the image after being filtered by an exemplary randomized RGB filter. 930 is the reconstructed color image. No noise was added leading to practically perfect reconstruction (PSNR≥300 dB).

We introduce an efficient algorithm for computing an MLE that works in the spatial domain. It states transform constraints such as sparsity and bandwidth limits in the spatial domain, and then computes an MLE via multi-variate normal regression. This approximates the Poissonian signal with a Gaussian distribution of the same variance and zero mean. Additive Gaussian noise can be handled similarly since the sum of Gaussian random variables is also a Gaussian random variable. See D. Montgomery, E. Peck, "Introduction to Linear Regression Analysis" for more on multi-variate normal regression. Other techniques for computing an MLE such as the EM algorithm can alternately be used. For details, see A. P. Dempster, N. M. Laird, D. B. Rubin, "Maximum Likelihood from Incomplete Data via the EM Algorithm", Journal of the Royal Statistical Society, Series B (Methodological) 39 (1): 1-38 (1977).

Regularization, which is discussed in detail in the later section "Other Regularization Techniques for Demosaicking" as a tool for solving under-determined inverse problems is also a powerful technique for noise suppression. This includes the Tikhanov method with various penalty functionals as well as the Landweber method and the Truncated Singular Valued Decomposition.

As described in the later section "Other Regularization Techniques for Demosaicking", the Landweber method as well as some versions of the Tikhonov method belong to a class of Regularization techniques that, instead of inverting the linear transform given in equation 19, effectively invert a slightly different one:

$$S^* \cdot (S \cdot \tilde{X} + \epsilon(\tilde{\Omega})) = S^* \cdot \tilde{Y}_\epsilon(\tilde{\Omega}) \qquad (23)$$

where $S^*$ is the conjugate transpose of S. The application of $S^*$ produces a filtering effect which reduces noise.

Dynamic Range and Sensitivity Expansion

Low intensity signals may be drowned by noise and high intensity signals may cause sensor saturation. The Dynamic Range of an imaging system is a measure of the range of intensities it can capture. Sensitivity, on the other hand, measures the system's responsiveness to low incident light. High dynamic range and increased low-light sensitivity are valuable characteristics.

Previous attempts at increasing sensitivity such as by M. Parmar and B. Wandell, "Interleaved Imaging: An Imaging System Inspired by Rod-Cone Vision", in Proc. SPIE Int. Soc. Opt. Eng, 2009 have made a subset of filter elements fully transmissive but have done so in regular patterns and have relied on empirically designed reconstruction techniques. U.S. patent application Ser. No. 11/191,729 by Compton and Hamilton of Eastman Kodak is another attempt that suffers from similar shortcomings. Alternative methods of controlling sensitivities of different subsets of photosites include changing the quantum efficiency of sensor elements or dynamically controlling the sensor elements' signal integration times instead of by changing filter element transmittance. See, for example, http://www.fujifilmusa.com/products/digital_cameras/exr/about/index.html.

Photosites of different colors and sensitivities can be handled by equations 10 and 14 and hence supported by the mathematics of section "A General Image Capture Problem Formulation". Photosite sensitivities can be controlled by any suitable method including filter element transmittance, sensor element efficiency or electronic signal integration times. As before, we allow partial spectral overlaps to increase packing efficiency and use a regular pattern of panchromatic filters or a random arrangement of high sensitivity and regular sensitivity photosites of various colors.

We can deal with photosites lost to saturation or underexposure by reducing the number of transform coefficients solved for. If a random CFA is used this can be done gracefully, as described in section "Random CFAs and graceful Error Handling".

The CFA mentioned above also serves to improve image-capture in high ISO settings or of low dynamic range scenes. In these scenarios sensor element saturation and underexposure are not a problem and reduced luminance noise is the benefit.

Chromatic Aberration Correction

Wavelength dependent refractive properties of camera optics can lead to geometric misalignment of the image in different colors. This is called Chromatic Aberration. The framework of the current invention allows for the incorporation of an elegant means of computationally correcting for this optical problem during image reconstruction.

Existing solutions to this problem apply independent geometric corrections to the images in the different basic colors either before or after image reconstruction. Applying this correction before image reconstruction is problematic because each color by itself may be sub-sampled and hence aliased. Lack of accurate images in basic colors makes it impossible to effect the geometric corrections.

The other case, wherein chromatic aberration is corrected after image reconstruction, is problematic because image reconstruction usually relies on correlations between the image in different basic colors. These correlations do not hold for images with chromatic aberration. See Sing Bing Kang, "Automatic Removal of Chromatic Aberration from a Single Image", 2007 IEEE Computer Society Conference on Computer Vision and Pattern Recognition (CVPR 2007), 18-23 Jun. 2007.

The framework of the present invention allows joint image reconstruction and chromatic aberration correction. This is particularly effective when color transforms that take advantage of correlations between basic colors such as red, green and blue are used, as is done in section "Image Model with Restricted Bandwidth". This is achieved by expressing the discrete samples of the undistorted image in terms of those of the observed distorted image in equation 14. This is done by first expressing the continuous signal in terms of the discretized samples and then applying the continuous domain geometric distortion of chromatic aberration to it before re-discretizing it. This expresses the discrete components of the undistorted image as image independent linear combinations of those of the observed distorted image. Correlation relations between the image in different colors mentioned in the section "Image Model with Restricted Bandwidth" may now be used on these undistorted variables. A solution of this system of equations will reconstruct the image with corrected chromatic aberration without incurring the drawbacks of the existing solutions mentioned above.

Chromatic aberration can be described as a combination of warping in the image plane and defocusing. We derive an explicit expression below for the discrete domain linear transformation corresponding to the former. While there is no exact way of correcting for the defocusing problem, some correction may be achieved by a space varying sharpening filter such as described in Sing Bing Kang, "Automatic Removal of Chromatic Aberration from a Single Image", 2007 IEEE Computer Society Conference on Computer Vision and Pattern Recognition (CVPR 2007), 18-23 Jun. 2007.

The discrete domain image is obtained from the continuous domain through sampling with rectangular photosites. This sampling may be described as a convolution with a 2D rectangular function followed by 2D Dirac comb sampling:

$$x_i = (x_i^c * H_{Box}) \cdot H_{Sample} \quad (24)$$

where $x_i^c$ is the continuous domain image in color $i \in \{r, g, b\}$ just before it gets filtered by the CFA and $x_i$ is the same image discretized by the sensor.

$$H_{Box}(u_1, u_2, w_1, w_2) \equiv Rect_2\left(\frac{u_1}{w_1}, \frac{u_2}{w_2}\right) \quad (25)$$

where $u_1$ and $u_2$ are continuous variables spanning the sensor length and width and $\omega_1$ and $\omega_2$ are the photosite length and width.

$$H_{Sample}(u_1, u_2, d_1, d_2) \equiv \frac{1}{d_1 d_2} DiracComb_2\left(\frac{u_1}{d_1}, \frac{u_2}{d_2}\right) \quad (26)$$

where $d_1$ and $d_2$ are the photosite spacings.

$x_i^c$ may be obtained from the ideal chromatic aberration free image $\tilde{x}^c$ through the warping functions $\tilde{u}_{1i}$ and $\tilde{u}_{2i}$. $\tilde{u}_{1i}$ and $\tilde{u}_{2i}$ are functions of $u_1$ and $u_2$ and are determined offline using existing methods for characterizing Chromatic Aberration.

$$x_i^c(u_1, u_2) = \tilde{x}_i^c(\tilde{u}_{1i}, \tilde{u}_{2i}) \quad (27)$$

Equation 24 for $\tilde{x}$ becomes $$\tilde{x}_i = (\tilde{x}_i^c * H_{Box}) \cdot H_{Sample} \quad (28)$$

which may be formally inverted:

$$\tilde{x}_i^c = \tilde{x}_i * H_{Lpf} * H_{Box}^{-1} \quad (29)$$

where $H_{Lpf}$ is a low pass filter that recovers the continuous signal, an example implementation of which is $$H_{Lpf} = \text{sinc}\left(\frac{2\pi u_1}{d_1}\right) \cdot \text{sinc}\left(\frac{2\pi u_2}{d_2}\right) \quad (30)$$

Equation 24 when combined with equations 27 and 29 becomes $$x_i = ((\tilde{x}_i * H_{Lpf} * H_{box}^{-1})(\tilde{u}_{1i}, \tilde{u}_{2i}) * H_{Box}) \cdot H_{Sample} \quad (31)$$

This expresses $x_i$ as a linear transform of $\tilde{x}_i$ as may be verified by writing the convolutions explicitly. Note that $H_{Lpf}$, $H_{Box}$, $H_{Box}^{-1}$ are functions of $(u_1, u_2)$.

$$x_i(m) = \quad (32)$$
$$\sum_n \bar{x}_i(n) \int_u du_1 \, du_2 \int_v dv_1 \, dv_2 H_{Lpf}(v-n) H_{Box}^{-1}(\bar{u}(u)-v) H_{Box}(m-u)$$

where the u and v integrals are over the sensor plane. This can be written as $$x_i(m) = \sum_n CA(m, n) \bar{x}_i(n) \quad (33)$$

where $$CA(m, n) = \quad (34)$$
$$\int_u du_1 \, du_2 \int_v dv_1 \, dv_2 H_{Lpf}(v-n) H_{Box}^{-1}(\bar{u}(u)-v) H_{Box}(m-u)$$

m, n may be rasterized to make them 1-dimensional, making this, in matrix notation $$x_i = CA \cdot \tilde{x}_i \quad (35)$$

This is an image independent linear transformation in the discrete domain. As previously mentioned, this may be combined with equation 14. The solution of the resulting inverse problem will correct Chromatic Aberration without the drawbacks of existing solutions mentioned earlier.

When joint image reconstruction and chromatic aberration correction described above is applied to existing CFA designs, numerical stability problems crop up. One cause of the underlying numerical stability problem is the loss of information from misaligned photosites of different colors. This is true of both the Bayer CFA and the newer panchromatic CFAs (see K. Hirakawa and P. J. Wolfe, "Spatio-spectral color filter array design for enhanced image fidelity" in Proc. of IEEE ICIP, pages II: 81-84, 2007 and L. Condat, "A New Class of Color Filter Arrays with Optimal Sensing Properties"). The present method of CFA design can yield an over-determined system of equations which makes it resilient to numerical stability problems.

Random CFAs of basic colors are especially suited for Chromatic Aberration correction since they avoid large (electromagnetic) bandwidth panchromatic filters resulting is sharper images in each basic color, and can gracefully handle loss of information in accordance with the section "Random CFAs and graceful Error Handling."

Sensor Lattice Jittering for Increased Bandwidth and graceful Aliasing

Aliasing occurs when the optical signal contains frequencies higher than can be captured by the sensor. Optical low pass filters are often used to remove these higher frequencies but some still leaks through due to filter non-idealities.

Figure 11:
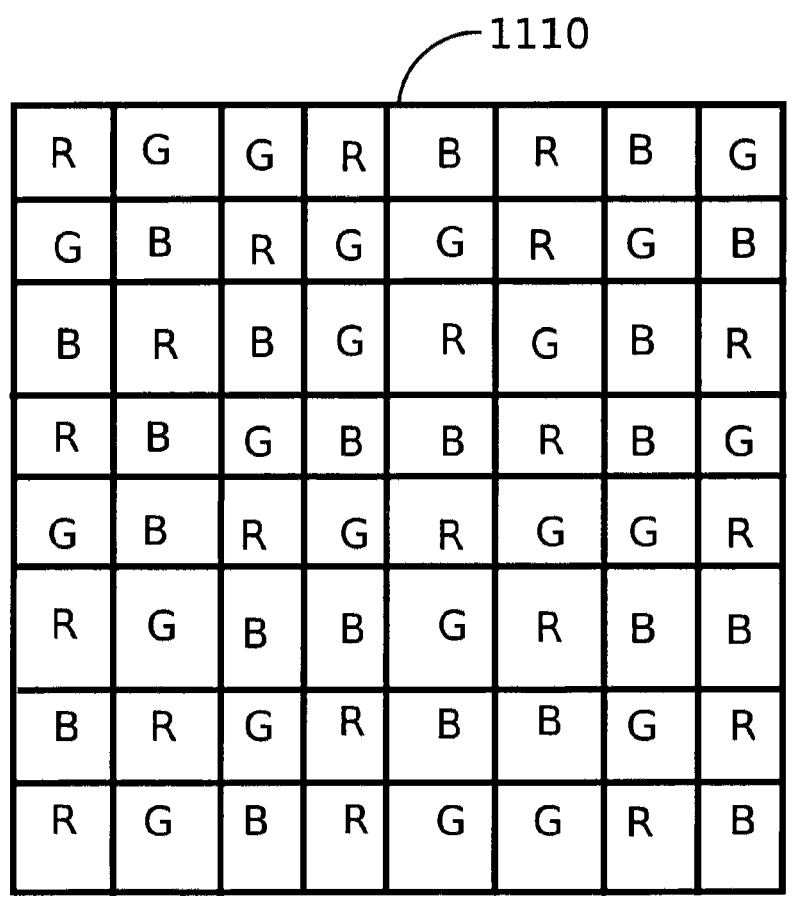
FIG. 11 illustrates an exemplary sensor with photosites and CFA arranged in a jittered sampling lattice.

Aliasing of color components can be handled by arranging photosite locations in a "jittered pattern". We use this term to refer to any irregular arrangement, including one where photosites on a regular lattice are perturbed a small distance. This perturbation is random and smaller than the distance between any two neighboring lattice points. The problem of adjacent photosites overlapping can be avoided by changing their size and geometry. An example pattern, shown in FIG. 11 makes these perturbations along the x and y directions identical along the same column and row respectively.

A jittered sensor requires changes to equation 14 to account for non-regular lattice locations and the non-regular photosite sizes affecting box filtering that varies from photosite to photosite. This is a straightforward modification of sampling theory along the lines of section "Chromatic Aberration Correction." This modified sampling equation allows the capture of image frequencies beyond the Nyquist limit of a regular sensor of the same size and number of photosites. Informally, a jittered sensor lattice is roughly equivalent to a sensor with a higher Nyquist frequency but with a random set of photosites removed.

Frequencies beyond the modeled image bandwidth are aliased to the reconstructed frequencies. Aliasing artifacts are randomized by jittering and thus spread over a large range of frequencies. This makes aliasing look similar to noise, which is less visually offensive. Dense spectral support of these artifacts also makes it amenable to noise reduction.

Techniques for reduction and hiding of aliasing described above allows the use of a milder optical low pass filter or the omission of it altogether. Practical Optical Low Pass Filters attenuate the higher sub-Nyquist frequencies so omitting them improves the signal to noise ratio of these higher frequencies.

Jittering may be used not just in color image sensors but in monochrome ones as well with the same corresponding benefits.

Pixel Binning and Line Skipping for Increased Speed

Frame rates in Video and high speed imaging are limited by sensor read-out rate. Pixel Binning and Line Skipping are two strategies commonly used to reduce read-out time by reading out fewer photosite values thereby sacrificing resolution for speed.

Aliasing is a problem in such systems because of reduced sensor Nyquist rate. If a random set of photosites is read out instead of line skipping and random sets of photosites are combined together instead of photosite binning, the image reconstruction problem becomes identical to the jittered sensor lattice case. Image reconstruction techniques described in section "Sensor Lattice Jittering for Increased Bandwidth and graceful Aliasing" can be used ameliorate the aliasing problem.

Other Regularization Techniques for Image Reconstruction

In the case where the frequency content of the image is too great for the linear transformation effected by the CFA to be invertible, we may choose to either gracefully degrade the image resolution as described in section "Random CFAs and graceful Error Handling" or attempt to partly extract it using approximation schemes. The problem of determining $\tilde{X}$ from equation 10 belongs to a class of problems called Linear Inverse Problems. This class of problems has a large body of existing solution techniques. See, for example, C. R. Vogel, "Computational Methods for Inverse Problems", Frontiers Appl. Math. 23, SIAM, Philadelphia, 2002. Many of these techniques were developed primarily in the medical and geophysical imaging fields and have to be adapted to our problem of color imaging using CFAs. There are a few salient features that CFA based color imaging adds to imaging in these other fields: firstly, the multiplexing of images in two or more colors onto one sensor image, secondly the linear relations corresponding to filtering by a CFA, thirdly correlations between the image in different colors and fourthly linear relations corresponding to approximately circular band limitedness of the optical signal.

Solution techniques to Linear Inverse Problems include, but are not limited to, Statistical Estimation and various forms of Regularization. Regularization refers to additional ad-hoc constraints such as image smoothness that allow partial reconstruction.

Regularization schemes already attempted in color imaging include Total Variation minimizing (see. T. Saito, T. Komatsu, "Demosaicing approach based on extended color total-variation regularization" in Proc. of IEEE ICIP, October 2008) and Edge preserving (see D. R. Cok, "Reconstruction of CCD images using template matching", Proc. IS&T's Annu. Conf. ICPS, 1994, pp. 380-385) techniques. We propose that the Regularization techniques used in these prior works may be improved by applying them on our full linear system including not just the linear transform of the CFA, as they have done, but the linear constraints corresponding to the image's frequency band limitedness as well.

We suggest an additional class of Regularization techniques that instead of inverting the linear transform given in equation 13 effectively invert a slightly different one:

$$S^* \cdot S \cdot \tilde{X} S^* \cdot \tilde{Y}(\tilde{\Omega}) \tag{36}$$

where $S^*$ is the conjugate transpose of $S$. The application of $S^*$ produces a filtering effect which allows approximate reconstruction. The Landweber method is one iterative technique that approximately solves this equation.

The Tikhanov regularization framework casts the signal reconstruction problem as an optimization problem and admits a variety of penalty functionals as its objective. The standard formulation uses an energy minimizing term which also leads to an approximate solution to equation 36. Total Variation minimization also corresponds to a particular penalty functional within the Tikhanov regularization framework. Truncated Singular Valued Decomposition is another effective regularization scheme which may be used for color image reconstruction. These regularization techniques are applied to each of the multiplexed images in each basic color. For details see M. Bertero, P. Boccacci, "Introduction to Inverse Problems in Imaging", Taylor & Francis, ISBN 0750304359, hereby incorporated by reference in its entirety.

The Bayesian framework may be used for regularization if a suitable prior is used. See Y. Hel-Or, "The canonical correlations of color images and their use for demosaicing" which computes a Maximum A Posteriori Estimate (MAP). We propose that this scheme may be improved by applying them on the full linear system including not just the linear transform of the CFA, as they have done, but the linear constraints corresponding to the image's frequency band limitedness as well.

Conjugate Gradient and Steepest Descent are two iterative techniques that may be used on Bayesian or other non-linear Regularization schemes.

Band limitedness and spectral sparsity constraints may be combined with any of the above techniques through the method of Projection On Convex Sets. In this scheme, at each iteration, the iterate is projected onto the set of band limited and spectrally sparse solutions. Solution positivity may also be imposed using a similar scheme.

FIG. 10 shows a listing of Matlab code used in a simulation based on the sparsity promotion approach to image reconstruction. This listing should be sufficient for anyone of ordinary skill in the art with a familiarity with the GPSR solver (http://www.1x.it.pt/mtf/GPSR/) to reproduce our results. With no noise added, a PSNR figure of 42 dB was obtained. With enough noise added so that the input image would have a PSNR of 39 dB, the reconstructed image had a PSNR of 34 dB.

Scalability of Image Reconstruction Algorithms

The scalability of the present image reconstruction scheme depends on the specific Inverse Problem solution technique used. When linear solution techniques are used, such as matrix inversion or MLE calculation, the result is a space variant FIR filter. The size of such filters can be reduced by windowing and associated techniques.

Scalability can also be achieved by the standard technique of blocking, wherein a pixel is reconstructed by only considering a small block of photosites around it. This works well because parts of images that are far away from each other are quite independent of each other, and hence have little influence on each other.

Faster though cruder reconstruction techniques may be used to generate image previews and high quality reconstruction may be performed offline, possibly on a PC.

Other Embodiments of the Invention

The present invention may be used not just for still imaging but for video as well. Besides a trivial extension to multiple frames, algorithms that perform joint reconstruction of multiple frames leveraging their correlation may also be used.

Instead of just color images in the visual spectrum, the present invention may also be used in other situations where multi-spectral image sensor systems are limited by geometric constraints. The present invention allows multi-spectral sampling to be folded into smaller sensors requiring smaller apertures without increased acquisition times.

The present invention may be used in conjunction with non-rectangular photosites and lattice arrangements including but not limited to hexagonal and octagonal schemes.

The present invention may be used in image scanners.

The present invention may be used in acquiring multi-spectral images in different number of dimensions including 1D and 3D.

The following computer code in files in .txt format and contained on the CD-Roms transmitted with the filing of this application are hereby incorporated by reference in their entirety:

```
C15_condat.png (1 KB)
determineEquations_Spatial_Chroma.txt (2 KB)
DetermineMinimalSize.txt (1 KB)
Evaluate_Stitcher_Pre_Spatial_Chroma_Dir.txt (8 KB)
EvaluateO_Tile_WithPre_Spatial_Chroma.txt (4 KB)
fftmtx.txt (1 KB)
GenerateEllipses.txt (1 KB)
GenerateElliptical Mask.txt (1 KB)
GenerateGoodPixels.txt (1 KB)
HelOrTransform.txt (1 KB)
LpfFFT.txt (1 KB)
Metrics.txt (1 KB)
msePickDirection.txt (1 KB)
reduce.txt (1 KB)
Sample.txt (3 KB)
```

The terms and expressions that have been employed in the foregoing specification are used therein as terms of description and not of limitation, and there is no intention, in the uses of such terms and expressions, to exclude equivalents of the features shown and described or portions thereof, it being recognized that the scope of the invention is defined and limited only by the claims which follow.

What is claimed is:

1. A method for processing an image, comprising:
    receiving a sample set of image data generated by transforming and sampling an optical property of an original color image in a spatial basis, wherein the transformation effected is substantially local in the spatial basis and is $\lambda$-Capture where $\lambda$ is 85 or greater; and
    producing a set of inferred noise-reduced image data, by applying a generalized inverse of said transform to the sample set of image data, wherein the transform respects predetermined spectral constraints,
    wherein said generalized inverse is computed by
        defining an inverse problem in the spatial domain,
        approximating the Poissonian photon shot noise at each photosensitive sensor element with a Gaussian probability distribution function of the same variance,
        approximating the mean of said Poissonian by computing an approximate solution to said inverse problem,
        combining said Gaussian probability distribution function with the Gaussian probability distribution function of any additive noise that is present to obtain a combined Gaussian probability distribution function, and
        using multi-variate normal regression on the combined Gaussian probability distribution function.

2. The method of claim 1, further comprising:
    providing an image sensor having a plurality of photosensitive sensor elements;
    providing an optical transformation device having a plurality of transformation elements responsive to the optical property wherein the transformation effected by the optical transformation device is substantially local in the spatial basis and is $\lambda$-Capture where $\lambda$ is 85 or greater;
    projecting the image onto the optical transformation device; and
    sensing at the image sensor the optical responses of the transformation elements to the original image to produce the sample set of data.

3. The method of claim 2, wherein providing an optical transformation device comprises providing an optical filter array having a plurality of filter elements.

4. The method of claim 3, wherein providing an optical filter array includes providing at least two sets of the filter elements that exhibit different responses to color.

5. The method of claim 4, wherein providing the optical filter elements includes arranging them in a random color pattern satisfying at least one predetermined distribution condition.

6. The method of claim 3, wherein the optical filter array is provided with filter elements responsive to one of several basic colors, the filter elements are arranged in a random color pattern, and the inferred original image data is produced in all of the basic colors.

7. The method of claim 6, wherein the optical filter array is provided with filter elements having a one-to-one relationship to substantially all the sensor array elements, each such filter element being responsive to one of the basic colors, the filter elements being arranged in a random color pattern satisfying at least one predetermined distribution condition, and the inferred original image data being produced in all of the basic colors.

8. The method of claim 3, wherein the optical filter array is provided with filter elements responsive to randomly composed panchromatic colors, the filter elements are arranged in a random pattern, and the inferred image data is produced along all axes of a suitable color space.

9. The method of claim 1, wherein said generalized inverse sets a predetermined set of higher frequency components of chrominance or other color difference signals substantially to zero, thereby giving more bandwidth to luminance than chrominance and said color filter array is random, whereby aliasing may be made visually less objectionable as well as reducible.

10. The method of claim 1, wherein said generalized inverse respects predetermined regularization constraints.

11. The method of claim 1, wherein said generalized inverse uses statistical estimation techniques.

12. The method of claim 11 wherein said statistical estimation technique includes computing a maximum likelihood estimator, a best linear unbiased estimator, a minimum variance linear estimator, and a maximum a posteriori estimator.

13. The method of claim 1, wherein the optical property is the intensity of one of several colors sampled in a random color pattern, and inferred original image data is produced in all of the basic colors.

14. The method of claim 1, wherein the optical property is the intensity of one of several panchromatic colors sampled in a random color pattern, and inferred image data is produced along all axes of a suitable color space for each inferred original image data element.

15. A system for processing an image, comprising:
a processor and memory, and
a data processing apparatus adapted to:
receive a sample set of image data generated by transforming and sampling an optical property of an original image in a spatial basis, wherein the transformation effected is substantially local in the spatial basis and is $\lambda$-Capture where $\lambda$ is 85 or greater; and
produce a set of inferred noise-reduced image data, by applying a generalized inverse of said transform to the sample set of image data, wherein the transform respects predetermined spectral constraints,
wherein said generalized inverse is computed by
defining an inverse problem in the spatial domain,
approximating the Poissonian photon shot noise at each photosensitive sensor element with a Gaussian probability distribution function of the same variance,
approximating the mean of said Poissonian by computing an approximate solution to said inverse problem,
combining said Gaussian probability distribution function with the Gaussian probability distribution function of any additive noise that is present to obtain a combined Gaussian probability distribution function, and
using multi-variate normal regression on the combined Gaussian probability distribution function.

16. The system of claim 15, further comprising:
an image sensor having a plurality of photosensitive sensor elements;
an optical transformation device having a plurality of transformation elements responsive to the optical property wherein the transformation effected by the optical transformation device is substantially local in the spatial basis and is $\lambda$-Capture where $\lambda$ is 85 or greater; and
an optical imaging device adapted to project the image onto the filter array, the image sensor being disposed with respect to the optical transformation device so as to receive the optical responses of the transformation elements to the image at the photosensitive elements corresponding thereto to produce the sample set of data.

17. The method of claim 1, wherein additionally chromatic aberration is corrected by augmenting said transform with a transform corresponding to chromatic aberration prior to image inference.

* * * * *